United States Patent
Tzeng

(10) Patent No.: US 7,493,612 B2
(45) Date of Patent: Feb. 17, 2009

(54) EMBEDDED SYSTEM AND RELATED METHOD CAPABLE OF AUTOMATICALLY UPDATING SYSTEM SOFTWARE

(75) Inventor: Ruey-Yuan Tzeng, Taipei (TW)

(73) Assignee: Lite-On Technology Corp., Neihu, Taipei (TW)

( * ) Notice: Subject to any disclaimer, the term of this patent is extended or adjusted under 35 U.S.C. 154(b) by 755 days.

(21) Appl. No.: 10/907,058

(22) Filed: Mar. 18, 2005

(65) Prior Publication Data

US 2006/0129793 A1 Jun. 15, 2006

(30) Foreign Application Priority Data

Dec. 9, 2004 (TW) .............................. 93138159 A

(51) Int. Cl.
*G06F 9/45* (2006.01)
(52) U.S. Cl. ..................................... 717/173
(58) Field of Classification Search ......... 717/171–173; 714/15; 713/191
See application file for complete search history.

(56) References Cited

U.S. PATENT DOCUMENTS 6,330,715 B1 * 12/2001 Razzaghe-Ashrafi ........ 717/171
6,625,754 B1 * 9/2003 Aguilar et al. ................. 714/15
7,055,148 B2 * 5/2006 Marsh et al. ................. 717/172
2005/0114685 A1 * 5/2005 Blinick et al. ............... 713/191

FOREIGN PATENT DOCUMENTS

| CN | 1362667 A | 8/2002 |
|---|---|---|
| CN | 1464386 A | 12/2003 |
| CN | 1466047 A | 1/2004 |
| WO | WO 03/104976 A2 | 12/2003 |

* cited by examiner

*Primary Examiner*—John Chavis
(74) *Attorney, Agent, or Firm*—Winston Hsu

(57) ABSTRACT

An embedded system and method capable of automatically updating system software. The embedded system includes a first storage device for storing a first system software and a boot image; a microcontroller coupled to the first storage device for respectively converting the first system software and the boot image into a system code and a boot code, for controlling booting of the embedded system; and a connecting interface coupled to the microcontroller and further coupled to an external data storage device through a data transmitting media. The external data storage device contains a second system software. The boot code includes an update agent interface programming (UAIP) code utilized for reading the second system software from the external data storage device through the connection interface to update the first system software.

28 Claims, 5 Drawing Sheets

EMBEDDED SYSTEM AND RELATED METHOD CAPABLE OF AUTOMATICALLY UPDATING SYSTEM SOFTWARE

BACKGROUND OF INVENTION

1. Field of the Invention

The invention relates to a device and related method for updating software, and more particularly, to a device and related method capable of automatically updating a system software of an embedded system.

2. Description of the Prior Art

Please refer to FIG. 1, which is a diagram of an embedded system 100 according to the prior art. The typical prior art embedded system 100 comprises a micro-controller 104, a plurality of storage devices 102 and 106, and a downloading interface 108. As shown in FIG. 1, the micro-controller 104, the storage devices 102 and 106, and the downloading interface 108 transfer data to each other through a bus 101. The storage device 102 is utilized to store a system software Sys_1 and a boot image Boot_1. Generally speaking, the storage device 102 is a non-volatile memory (e.g., a flash memory). The micro-controller 104 is utilized to respectively transform the system software Sys_1 and boot image Boot_1 into a system code Sys_Code and a boot code Boot_Code and orderly execute the boot code Boot_Code and the system code Sys_Code to control booting of the embedded system 100. The storage device 106 is utilized to temporarily store the above-mentioned system code Sys_Code and the boot code Boot_Code. Generally speaking, the storage device 106 is a volatile memory (e.g., a random access memory). The downloading interface 108 is coupled to a computer host 130 through a data transmission media 120. Furthermore, the computer host 130 stores another system software Sys_2. For the prior art embedded system 100, the downloading interface 108 can be a serial port, a joint test action group (JTAG) interface, or a network interface. However, users must operate the computer host 130 manually to upload the system software Sys_2 to the embedded system 100 through the data transmission media 120 such as a cable, a LAN, a WLAN, or an internet to perform an update to the original system software Sys_1.

Please refer to FIG. 2, which is an operational flow chart of updating the system software Sys_1 of the embedded system 100 shown in FIG. 1. The flow chart comprises the following steps:

Step 200: Couple the embedded system 100 to the computer host 130 through the downing interface 108 and the data transmission media 120;

Step 210: A user manually operates the computer host 130, and uploads the system software Sys_2 stored in the computer host 130 to the storage device 106 of the embedded system 100; and Step 220: The micro-controller 104 reads the system software Sys_2 stored in the storage device 106 and utilizes the system software Sys_2 to update the original software Sys_1 stored in the storage device 104.

As mentioned above, the prior art embedded system 100 requires a manual operation of another external computer host 130 to update its system software (e.g., an operating system). Therefore, a great amount of time is required when the amount of system software to be updated is large. Furthermore, because the embedded system relies on users to manually operate the computer host 130 to update the system software, the users need to own the computer host 130 and must also have knowledge of operating the computer host 130. Therefore, the inconvenience for users is a serious problem.

SUMMARY OF INVENTION

It is therefore one of primary objectives of the claimed invention to provide a device and method capable of automatically updating system software of an embedded system, to solve the above-mentioned problem.

According to an exemplary embodiment of the claimed invention, an embedded system capable of automatically updating system software is disclosed. The embedded system comprises: a first storage device for storing a first system software and a boot image; a micro-controller coupled to the first storage device for respectively transforming the first system software and the boot image into a system code and a boot code and for orderly executing the boot code and the system code to control booting of the embedded system; and a connecting interface coupled to the micro-controller and coupled to an external data storage device through a data transmission media, the external data storage device storing a second system software; wherein the boot code comprises an update agent interface programming (UAIP), and the micro-controller is capable of executing the update agent interface programming to read the second system software from the external data storage device through the connecting interface before executing the system code.

According to an exemplary embodiment of the claimed invention, a method for automatically updating system software of an embedded system is disclosed. The embedded system stores a first system software and a boot image, the method comprises: respectively transforming the first system software and the boot image into a system code and a boot code, wherein the boot code and the system code are orderly executed to control booting of the embedded system, and the boot code comprises an update agent interface programming (UAIP); coupling the embedded system to an external data storage device through a data transmission media, the external data storage device storing a second system software; and before executing the system code, executing the update agent interface programming to read the second system software from the external data storage device in order to update the first system software.

The present invention device and method capable of automatically updating the embedded system can utilize an update agent interface programming to determine, when loading a boot code, whether to automatically update the system software of the embedded system. Therefore, it can enormously reduce the memory wasting of the embedded system. That is, the update agent interface programming is placed in the boot code and executed instead of being placed in the application software and executed. Therefore, the update agent interface programming does not occupy the system memory after the embedded system is booted. Furthermore, the present invention can reduce the cost and utilization of human resources because the present invention can automatically update the system software. Therefore, the present invention can improve the convenience of the embedded system because the users no longer need to operate another computer host.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
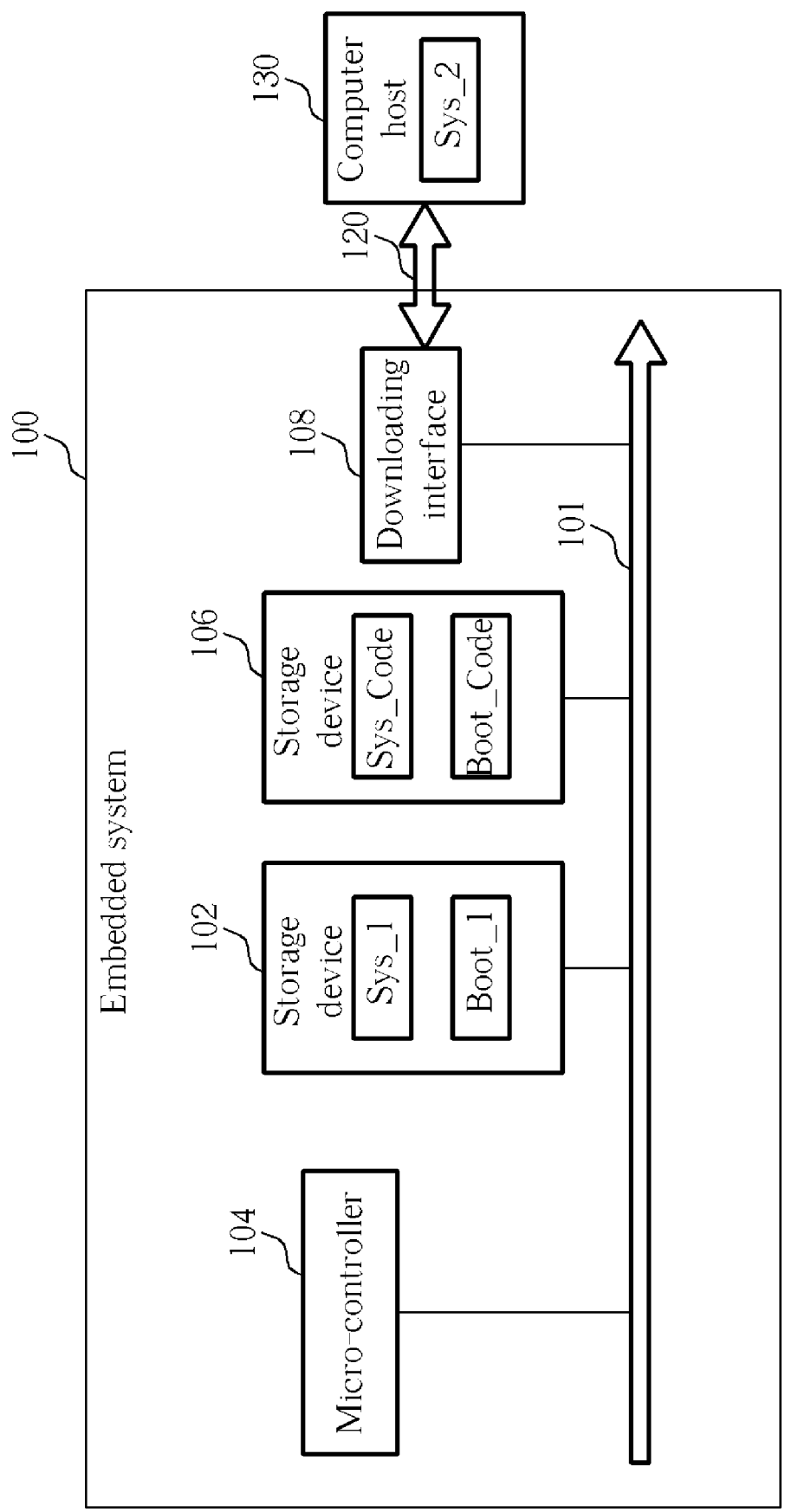
FIG. 1 is a diagram of an embedded system according to the prior art.
Figure 2:
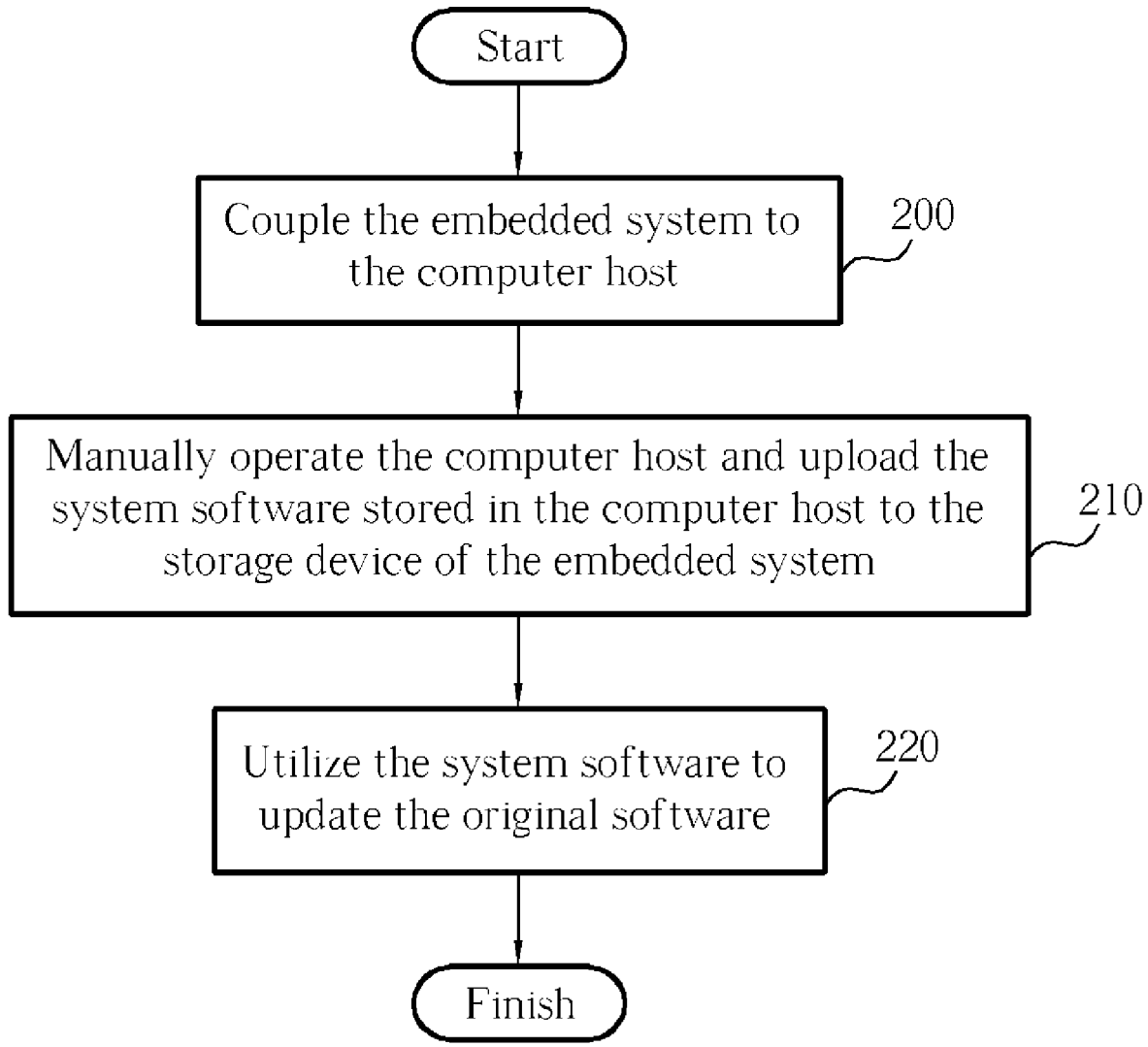
FIG. 2 is an operational flow chart of updating the system software of the embedded system shown in FIG. 1.
Figure 3:
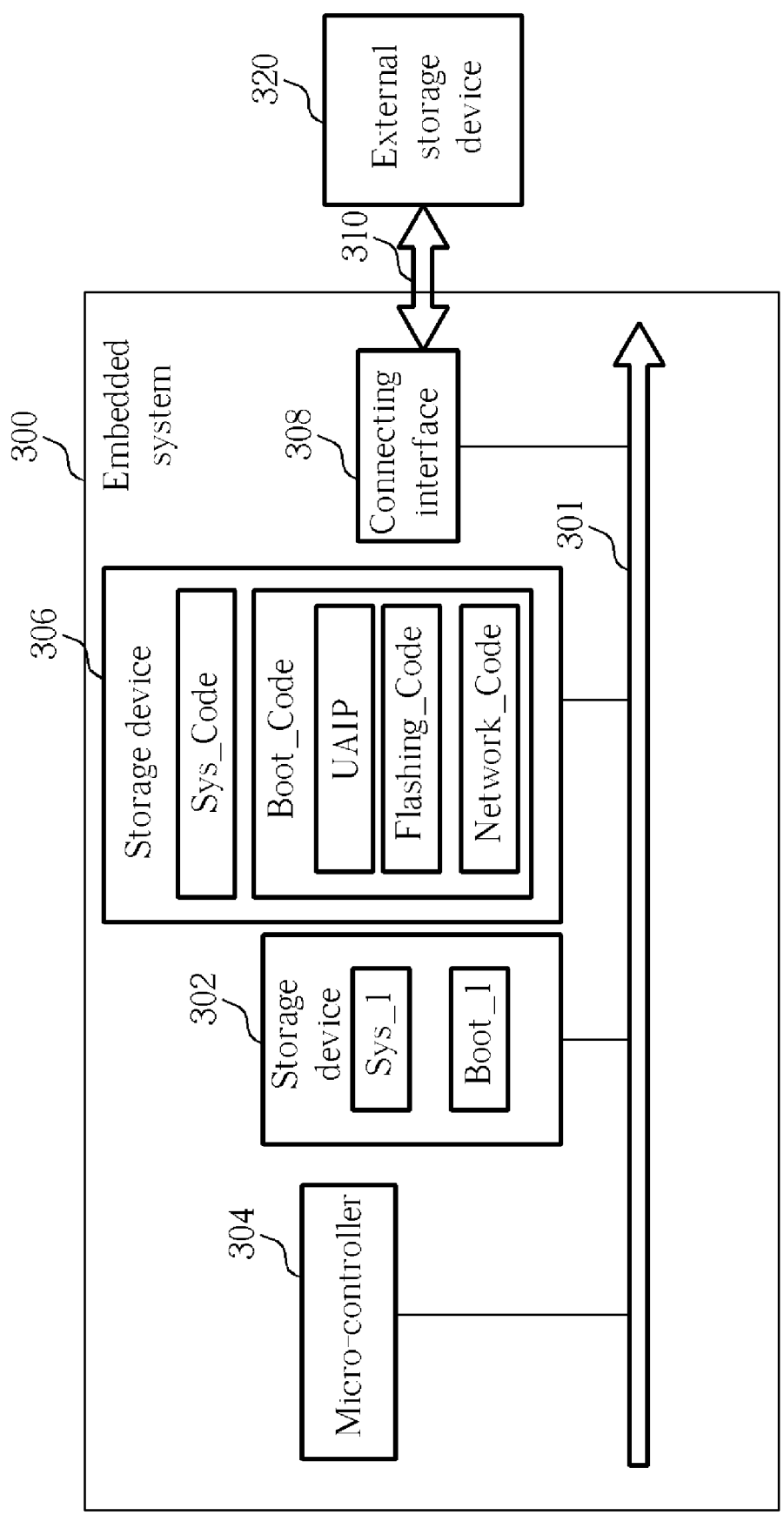
FIG. 3 is a diagram of an embedded system of a first embodiment according to the present invention.

Please refer to FIG. 3, which is a diagram of an embedded system 300 of a first embodiment according to the present invention. The embedded system 300 comprises a micro-controller 304, a plurality of storage devices 302 and 306, and a connecting interface 308. As shown in FIG. 3, the micro-controller 304, a plurality of storage devices 302 and 306, and the connecting interface 308 transfer data to each other through a bus 301. In this embodiment, the embedded system 300 utilizes a flash memory to achieve the storage device 302 and utilizes a dynamic random access memory DRAM to achieve the storage device 306. However, the present invention is not limited to the type of the storage devices 302 and 306. In other words, the storage device 302 can be other types of non-volatile memories and the storage device 306 can be other types of volatile memories.

The storage device 302 is utilized to store a system software Sys_1 and a boot image Boot_1, and the micro-controller 304 is utilized to respectively transform the system software Sys_1 and the boot image Boot_1 into a system code Sys_Code and a boot code Boot_Code and to orderly execute the boot code Boot_Code and the system code Sys_Code to control booting of the embedded system 300. Please note that in this embodiment, the boot code Boot_Code comprises an update agent interface programming (UAIP), a burning program code Flashing_Code, and a network connecting program code Network_Code. As shown in FIG. 3, the storage device 306 is utilized to temporarily store the system program code Sys_Code and the boot code Boot_Code for the micro-controller 304 to read the boot code Boot_Code and the system code Sys_Code to perform related operation. The connecting interface 308 is coupled to an external data storage device 320 through a data transmission media, wherein the external data storage device 320 stores a system software Sys_2. Please note that in this embodiment, the connecting interface 308 is a network interface for transferring data to or from the external storage device 320 (e.g., a server) through a transmission control protocol/internet protocol (TCP/IP). Furthermore, the data transmission media 310 can be a local network, an intranet, or an internet. However, the above-mentioned devices are only utilized as a preferred embodiment and do not represent a limitation. In other words, the present invention is not limited by the type of the connecting interface or the data transmission media.

Figure 4:
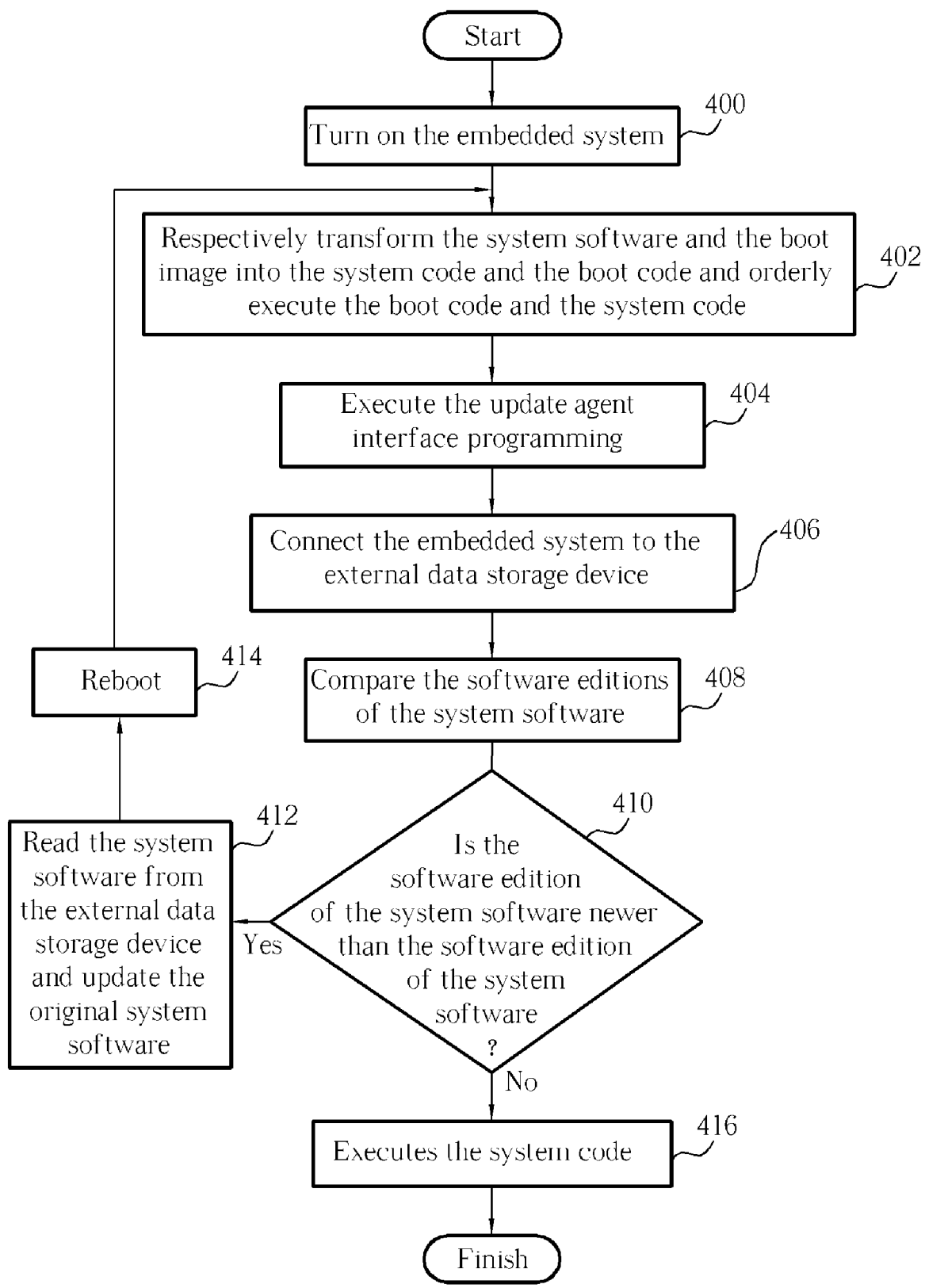
FIG. 4 is a flow chart of the operation of updating system software of the embedded system shown in FIG. 3.

To clearly illustrate the operation of updating system software of the present invention, please refer to FIG. 4. FIG. 4 is a flow chart of the operation of updating system software Sys_1 of the embedded system 300 shown in FIG. 3. The flow chart comprises the following steps:

Step 400: Turn on the embedded system 300;

Step 402: The micro-controller 304 respectively transforms the system software Sys_1 and the boot image Boot_1 into the system code Sys_Code and the boot code Boot_Code and orderly executes the boot code Boot_Code and the system code Sys_Code to control booting of the embedded system 300;

Step 404: Before executing the system code Sys_Code, the micro-controller 304 executes the update agent interface programming (UAIP);

Step 406: The update agent interface programming starts the network connecting program code Network_Code to connect the embedded system 300 to the external data storage device 320 through the data transmission media 310;

Step 408: The update agent interface programming reads information of the software edition of the system software Sys_2 and compares the software editions of the system software Sys_1 and Sys_2;

Step 410: If the software edition of the system software Sys_2 is more recent than the software edition of the system software Sys_1 then go to step 412; otherwise, go to step 416;

Step 412: The update agent interface programming reads the system software Sys_2 from the external data storage device 320 and initializes the burning program code Flashing_Code to update the original system software Sys_1 according to the system software Sys_2;

Step 414: The boot code Boot_Code drives the embedded system 300 to reboot, and then go back to step 402; and Step 416: The micro-controller 304 executes the system code Sys_Code.

A further illustration of the operation of updating system software of the embedded system 300 is as follows: First, the boot image Boot_1 stored in the storage device 302 is loaded into the storage device 306. Next, the micro-controller 304 transforms the boot image Boot_1 into the boot code Boot_Code. The micro-controller 304 can now execute the boot code Boot_Code to control booting of the embedded system 300. The boot code Boot_Code firstly initializes the hardware devices of the embedded system 300 and then secondly executes the update agent interface programming of the boot code Boot_Code. Thirdly, the update agent interface programming starts the network connecting program code Network_Code of the boot code Boot_Code to read information of the system software Sys_2 stored in the external storage device 320 through the connecting interface 308 and finally the boot code Boot_Code determines whether to utilize the system software Sys_2 to update the system software Sys_1 originally stored in the embedded system. In this embodiment, the operation of reading data from the external data storage device 320 is as follows: Firstly, load the network connecting program code Network_Code. The network connecting program code Network_Code can obtain the needed IP address of the embedded system utilizing a dynamic host configuration protocol (DHCP) or a static IP address. Secondly, the network connecting program code Network_Code can initiate a trivial file transfer protocol (TFTP), hypertext transfer protocol (HTTP), or other network protocols to connect to the external data storage device 320. In this embodiment, we assume that the external data storage device 320 is a TFTP server, therefore, the update agent interface programming can read the edition information of the system software Sys_2 in the file database of the TFTP server through a TFTP protocol supported by the network connecting program code Network_Code. Furthermore, the edition information is utilized to compare with the edition information of the system software Sys_1 stored inside the embedded system 300. The comparison operation will be illustrated in the following disclosure.

If the software edition of the system software Sys_2 is more recent than the system software Sys_1 then the micro-controller 304 executes the update agent interface programming to determine that the system software Sys_2 needs to be utilized to update the system software Sys_1. The flow of utilizing the system software Sys_2 to update the system software Sys_1 is as follows:

Firstly, the update agent interface programming initializes the network connecting program code Network_Code to download the system software Sys_2 to the storage device 306. Secondly, the update agent interface program code initializes the burning program code Flashing_Code. Therefore, the micro-controller 304 can execute the burning program codes Flashing_Code to burn the system software Sys_2 into the storage device 302 in order to achieve the purpose of updating the system software Sys_1. Lastly, the boot code Boot_Code drives the embedded system 300 to reboot.

In the following disclosure, we discuss the data content of the system software Sys_1 and Sys_2. In this embodiment, the system software Sys_1 comprises a kernel image and a file system image. Unlike Sys_1, the system software Sys_2 can comprise any of three possible images as follows: only comprises the kernel image, only comprises the file system image, or simultaneously comprise both the kernel image and the file system image. If the system software Sys_2 only comprises the kernel image, after the system software Sys_1 is updated, only the kernel image of the system software Sys_1 is updated to the system software Sys_2. That is, the file system image of the system software Sys_1 remains unchanged. Similarly, if the system software Sys_2 only comprises the file system image, after the system software Sys_1 is updated, only the file system image of the system software Sys_1 is updated to the system software Sys_2. That is, the kernel image of the system software Sys_1 remains unchanged. As mentioned above, if the system software Sys_2 comprises both the kernel image and the file system image then both of the kernel image and the file system image of the system software Sys_1 are updated.

After the system software Sys_1 is updated to system software Sys_2 and the embedded system 300 reboots, the above-mentioned operation is repeated. That is, the update agent interface programming determines whether to automatically update the current system software Sys_2 of the embedded system 300. At this time, the system software Sys_1 has already been replaced by the system software Sys_2. Therefore, if the external data storage device 320 stores a system software Sys_3 (not shown), whose software edition is more recent than the system software Sys_2, then the current system software Sys_2 is updated. Otherwise, after the boot code Boot_Code completes the booting operation, the system code Sys_Code is directly executed without updating the current system software Sys_2. Furthermore, after the system code Sys_Code is loaded successfully, the embedded system 300 completes the booting operation. Next we discuss the operation of comparing the software editions of the system software Sys_1 and Sys_2.

In this embodiment, the update agent interface programming compares the software editions of the system software Sys_1 and Sys_2 according to their timing tags (e.g., the establishing timing of the file). That is, if the timing tag of the system software Sys_2 and Sys_1 shows that the establishing timing of the system software Sys_2 is later than that of the system software Sys_1 then the update agent interface programming utilizes the system software Sys_2 to update the system software Sys_1 through the burning program code Flashing_Code. Please note that the present invention is not limited to utilizing the timing tags to compare software editions. That is, the present invention can utilize other methods to compare the software editions. For example, the update agent interface programming can compare the software editions according to the file names of the system software Sys_1 and Sys_2. Furthermore, please note that in the above-mentioned embodiment, the update agent interface programming, the burning program code Flashing_Code, and the network connecting program code Network_Code are respectively standalone programs. However, the burning program code Flashing_Code and the network connecting program code Network_Code can also be integrated in the update agent interface programming. ###This characteristic provides flexibility to the present invention.

Figure 5:
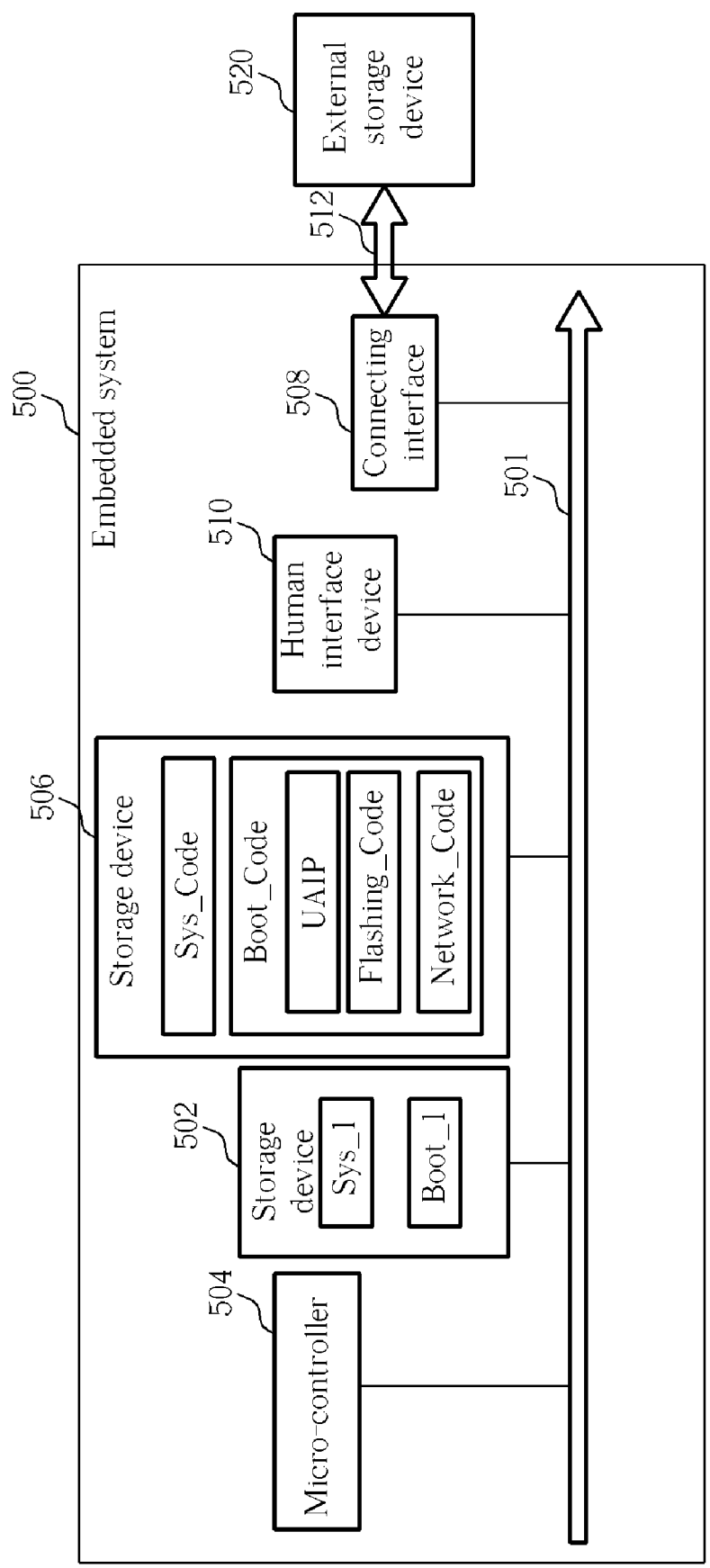
FIG. 5 is a diagram of an embedded system of a second embodiment according to the present invention.

Please refer to FIG. 5, which is a diagram of an embedded system 500 of a second embodiment according to the present invention. The embedded system 500 comprises a micro-controller 504, a plurality of storage devices 502 and 506, a connecting interface 508, and a human interface device (HID) 510. As shown in FIG. 5, the micro-controller 504, the storage devices 502 and 506, the connecting interface 508, and the human interface device 510 transfer data to each other through a bus 501. Similarly, the connecting interface 508 is coupled to an external data storage device 520 through a data transmission media 512. Please note that the devices having the same name have the same function and operation, and thus the further illustration is omitted here. From FIG. 3 and FIG. 5, it is easily observed that the embedded system 500 in this embodiment is very similar to the embedded system 300 from the first embodiment with the one difference being in the human interface device 510. That is, the embedded system 500 further comprises the human interface device 510, which is coupled to micro-controller 504 for allowing the users of the embedded system 500 some amount of manual involvement during the updating operation. In other words, the users can utilize the human interface device 510 to input commands to control the update agent interface programming to determine whether to update the system software Sys_1.

For example, when the boot code Boot_Code is executed, the human interface device 510 displays an indication message on the screen (not shown) of the embedded system 500. Therefore, the users can utilize the human interface device 510 to send a command to determine the status of the update agent interface programming (e.g., is it executing). Furthermore, the users can utilize the human interface device 510 to set the execution mode of the update agent interface programming to "manual". Therefore, the update agent interface programming can show the comparison result on the screen of the embedded system 500, and the users can manually utilize the human interface device 510 to send a command to decide whether to update the system software. In summary, the embedded system 500 can provide the users another choice. In other words, the embedded system 500 has superior flexibility.

In contrast to the prior art, the present invention can utilize an update agent interface programming to determine whether to automatically update the system software of the embedded system when loading a boot code. Therefore, it can enormously reduce the memory wasting of the embedded system. That is, the update agent interface programming is placed in the boot code and executed instead of being placed in the application software and executed. Therefore, the update agent interface programming does not occupy the system memory after the embedded system boots. Furthermore, the present invention can reduce the cost and the utilization of human resources because the present invention can automatically update the system software. Therefore, the present invention can raise the convenience of the embedded system because the users no longer need to operate another computer host.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An embedded system capable of automatically updating system software, the embedded system comprising:
   a first storage device for storing a first system software and a boot image;
   a micro-controller coupled to the first storage device for respectively transforming the first system software and the boot image into a system code and a boot code and for orderly executing the boot code and the system code to control booting of the embedded system; and
   a connecting interface coupled to the micro-controller and coupled to an external data storage device through a data transmission media, the external data storage device storing a second system software;
   wherein the boot code comprises a update agent interface programming (UAIP), and the micro-controller is capable of executing the update agent interface programming to read the second system software from the external data storage device through the connecting interface before executing the system code.

2. The embedded system of claim 1, wherein the micro-controller executes the update agent interface programming to compare a software edition of the first system software with the software edition of the second system software, and if the software edition of the second system software is more recent than the software edition of the first system software, the micro-controller executes the update agent interface programming to utilize the second system software to update the first system software.

3. The embedded system of claim 2, wherein the update agent interface programming compares the software editions according to timing tags of the first and the second system software.

4. The embedded system of claim 3, wherein if the timing tag of the first system tag is earlier than the timing tag of the second system software, the micro-controller executes the update agent interface programming to utilize the second system software to update the first system software.

5. The embedded system of claim 2 further comprising:
   a second storage device coupled to the micro-controller for temporarily storing the system code and the boot code;
   wherein the boot code further comprises a burning program code, and if the update agent interface programming decides to utilize the second system software to update the first system software, the update agent interface programming downloads the second system software to the second storage device and the micro-controller executes the burning program to burn the second system software in the first storage device in order to update the first system software.

6. The embedded system of claim 5, wherein the first storage device is a non-volatile memory and the second storage device is a volatile memory.

7. The embedded system of claim 6, wherein the non-volatile memory is a flash memory, and the volatile memory is a dynamic random access memory (DRAM).

8. The embedded system of claim 2, wherein the update agent interface programming compares the software editions according to the file names of the first and the second system software.

9. The embedded system of claim 2, wherein if the update agent interface programming updates the first system software completely, driving the embedded system to reboot.

10. The embedded system of claim 2, wherein if the software edition of the second system software is not as recent as the software edition of the first system software, the micro-controller directly executes the system code and does not update the first system software after executing the boot code completely.

11. The embedded system of claim 1, wherein the connecting interface is a network interface for transferring data to or from the external storage device through a transmission control protocol/internet protocol (TCPIP).

12. The embedded system of claim 11, wherein the data transmission media is a local network, an intranet, or an internet.

13. The embedded system of claim 11, wherein the first system software comprises a kernel image and a file system image, and the second system software comprises a kernel image or a file system image.

14. The embedded system of claim 13, wherein the second system software comprises both of a kernel image and a file system image.

15. The embedded system of claim 1 further comprising a human interface device (HID) coupled to the micro-controller for controlling the micro-controller whether to execute the update agent interface programming to update the first system software.

16. A method for automatically updating system software of an embedded system, the embedded system stores a first system software and a boot image, the method comprising:
   (a) respectively transforming the first system software and the boot image into a system code and a boot code, wherein the boot code and the system code are orderly executed to control booting of the embedded system, and the boot code comprises an update agent interface programming (UAIP);
   (b) coupling the embedded system to an external data storage device through a data transmission media, the external data storage device storing a second system software; and
   (c) before executing the system code, executing the update agent interface programming to read the second system software from the external data storage device in order to update the first system software.

17. The method of claim 16, wherein step (c) comprises:
   (c1) executing the update agent interface programming to compare a software edition of the first system software with the software edition of the second system software; and
   (c2) if the software edition of the first system software is more recent than the software edition of the second system software, executing the update agent interface programming to utilize the system software to update the first system software.

18. The method of claim 17, wherein step (c1) comprises:
   comparing the software editions of the first and the second system software according to timing tags of the first and the second system software.

19. The method of claim 18, wherein step (c2) comprises:
   if the timing tag of the first system software is earlier than the timing tag of the second system, executing the update agent interface programming to utilize the second system software to update the first system software.

20. The method of claim 17, wherein the boot code further comprises a burning program code, and step (c2) comprises:
   downloading the second system software, and then executing the burning program code to burn the second system software to the first storage device in order to update the first system software.

21. The method of claim 17, wherein step (c1) comprises:
comparing the software editions of the first and the second system software according to file names of the first and the second system software.

22. The method of claim 17 further comprising:
(c3) if the update agent interface programming updates the first system software completely, driving the embedded system to reboot.

23. The method of claim 17 further comprising:
(c3) if the software edition of the second system software is not as recent as the software edition of the first system software, directly executing the system code without updating the first system software after executing the boot code.

24. The method of claim 16, wherein step (b) comprises:
transferring data to or from the external storage device through a transmission control protocol/internet protocol (TCPIP).

25. The method of claim 24, wherein the data transmission media is a local network, an intranet, or an internet.

26. The method of claim 16, wherein the first system software comprises a kernel image and a file system image, and the second system software comprises a kernel image or a file system image.

27. The method of claim 26, wherein the second system software simultaneously comprises both a kernel image and a file system image.

28. The method of claim 16, wherein step (c) comprises:
providing a human interface device (HID) and utilizing the human interface device to determine when to control the micro-controller whether to execute the update agent interface programming to update the first system software.

* * * * *